United States Patent
Kolbel

[11] 3,842,442
[45] Oct. 22, 1974

[54] ENDOPROSTHETIC SHOULDER JOINT
[75] Inventor: Reinhard Kolbel, Berlin, Germany
[73] Assignee: National Research Development Corporation, London, England
[22] Filed: Sept. 4, 1973
[21] Appl. No.: 394,247

[30] Foreign Application Priority Data
  Sept. 4, 1972  Great Britain .................... 40969/72

[52] U.S. Cl. ...................................... 3/1, 128/92 C
[51] Int. Cl. .............................................. A61f 1/24
[58] Field of Search ..... 3/1; 128/92 C, 92 CA, 92 R

[56]  References Cited
  UNITED STATES PATENTS
  3,694,820  10/1972  Scales et al. .................................. 3/1
  3,803,641  4/1974  Golyakhovsky ............................. 3/1
  FOREIGN PATENTS OR APPLICATIONS
  1,047,640  7/1953  France .............................. 128/92 C
    426,096  6/1967  Switzerland ................................. 3/1

Primary Examiner—Richard A. Gaudet
Assistant Examiner—Ronald L. Frinks
Attorney, Agent, or Firm—Cushman, Darby & Cushman

[57]  ABSTRACT

An endoprosthetic shoulder joint device comprises a scapular component of generally Y-shape of which the arms serve as fixation members and the stem terminates at its free end in a part-spherically shaped bearing surface. This component co-operates with a humeral component having a bearing member with a complementary bearing surface for mutual articulatory bearing engagement, and a fixation member, such as an intramedullary stem, extending from the bearing member. The arms of the humeral component extend first laterally from the stem and then longitudinally remotely, or one arm is of this form while the other is a longitudinal extension of the stem. In the former case, the arms define an obtuse angle as viewed along the stem. Preferably the scapular component bearing surface is a ball, and that of the humeral component a socket.

13 Claims, 11 Drawing Figures

PATENTED OCT 22 1974　　　　　　3,842,442

ENDOPROSTHETIC SHOULDER JOINT

This invention concerns prosthetic devices and relates particularly to endoprosthetic shoulder joint devices which permit total replacement in that the articular functions of both the scapular glenoid and humeral head are provided by the device.

Until recently, only humeral head replacement was available and even now there is very little in the way of commercially available total shoulder joint replacement devices. This situation contrasts markedly with the considerable range of endoprosthetic devices which are available for lower limb bone joint replacement, particularly the hip joint, but there are difficulties which arise with the shoulder joint which are not encountered with the hip joint. These difficulties include the large range of movement of the shoulder joint, the complexity of the shoulder joint capsule and resultant difficulty of access, the generally tensile rather than compressive loading of the arm compared with the leg, and the small bone masses available in the scapula for the purposes of device fixation.

In any event an object of the present invention is to provide an endoprosthetic shoulder joint device which takes account of these difficulties, and such a device comprises: associated scapular and humeral components, the scapular component including a generally Y-shaped structure having two Y-arms and a Y-stem, said Y-arms being first fixation members, and said Y-stem being a first bearing member terminating at its free end in a substantially part-spherically shaped bearing surface; and the humeral component including a second bearing member having a substantially part-spherically shaped second bearing surface complementary to said first surface for mutual articulatory bearing engagement between said bearing members, and a second fixation member extending from said second bearing member remotely from said second surface.

A principle feature of this proposed device resides in the adaptation of the scapular component for fixation by the provision of the Y-arms, and this adaption can take one of two basic forms.

In a first form: both of the Y-arms extend first laterally from the Y-stem and then longitudinally remotely from the stem; and the arms normally will be angled or curved as viewed along the stem to include an obtuse angle. This angle serves as part of an adaption for respective securement of the Y-arms to two of the bony buttresses of the scapular webs which radiate from the glenoid cavity, namely, the lateral margin, the base of the spine, and the caracoid process of the scapular.

In a second form of adaption: only one of the Y-arms extends as aforesaid from the Y-stem for securement to one of the scapular buttresses, while the other arm is a longitudinal extension of the Y-stem for securement in the glenoid cavity.

Among secondary features of either form of adaption, the free end of an appropriate Y-arm can be formed to engage one, or be forked to engage opposite sides, of one of the scapular buttresses. Also, the desired fixation of a Y-arm can be effected by the use of acrylic cement or equivalent gap-filling medium, bone screws, possibly by bone in-growth into a porous surface, or by a combination of such techniques. Detailed features of the Y-arms can correspondingly involve the provision of relieved surfaces to key cement, apertures to receive screws or afford access paths for cement, a porous surface, or a combination thereof, in parts of the member which engage the scapula.

The second fixation member of the humeral component normally will comprise an intramedullary stem and this component can be of basically two-part construction with a fixation member of metal to which a bearing member of plastic material is connected for bearing engagement with a scapular component bearing member of metal. Such a two-part construction may be assembled during manufacture or implantation. Alternatively, the humeral component can comprise bearing and fixation members integrally formed from plastics material.

Also, it is preferred that, in contrast to the natural joint, the first and second bearing surfaces of the scapular and humeral components be respectively convex and concave. It is, in any case, preferred that both of the bearing surfaces be of major spherical segment shape, that is to say, greater than hemispherical. In this connection one of the bearing members (normally that which is concave) can be sufficiently resilient to engage the other in a snap-fit manner, or the former member can be of split form and co-operate with a locking ring to engage the latter member in captive manner.

The above and other features of the present invention will now be clarified by the following description, given by way of example, with reference to the accompanying drawings, in which.

Figure 11:
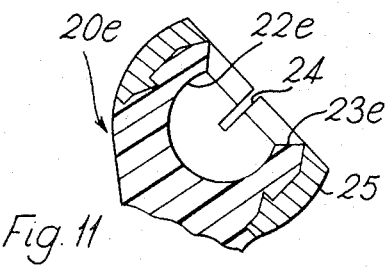

FIGS. 7 and 8, and 9 and 10 are corresponding pairs of schematic sectional and rear views of two respectively different humeral component embodiments, and FIG. 11 is a schematic sectional view of part of another humeral component embodiment.

For convenience corresponding parts of the various embodiments will be denoted generally by a common reference numeral, while the various parts of a particular embodiment will be additionally denoted by a common reference letter.

Figure 3:
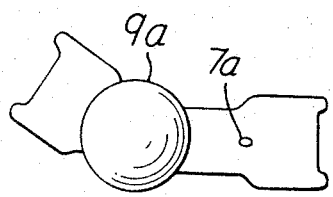
FIGS. 1, 2, 3 and 4 are respective side, plan, underneath and end views of one scapular component embodiment.
Figure 2:
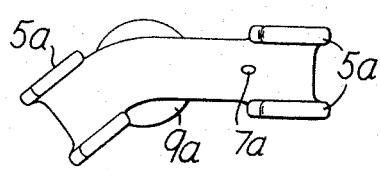
Figure 5:
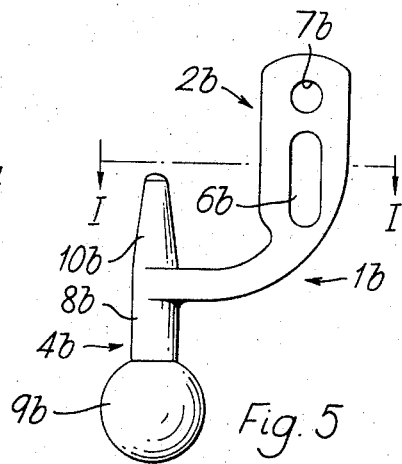
FIGS. 5 and 6 are respective side view and partly sectioned view from below (taken in I — I in FIG. 5) of another scapular component embodiment.
Figure 6:
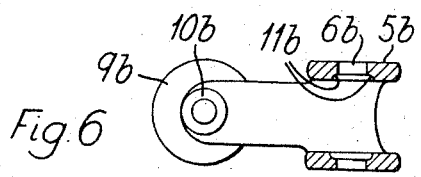

The first scapular component embodiment is denoted generally as 1a and comprises a Y-shaped structure comprising two Y-arms 2a and 3a, and a Y-stem 4a. The arms each extend first laterally from the stem and are mutually inclined as viewed along the stem (FIGS. 2 and 3) to include an obtuse angle. The arms thereafter extend substantially oppositely from the stem in free end portions 5a which are forked to embrace a buttress and slotted at 6a for securement to the buttresses by way of screws. The arms may be additionally apertured, as at 7a between their forked ends and junction with the stem, for passage of bone screws into the buttresses.

The stem 4a comprises a shaft 8a which terminates at its free end in a spherically-shaped head 9a, the shaft being of necked form relative to the ball.

Figure 1:
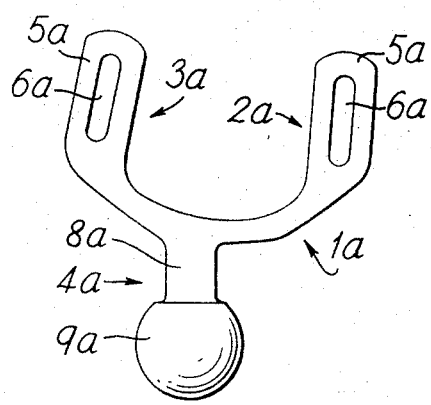
Figure 4:
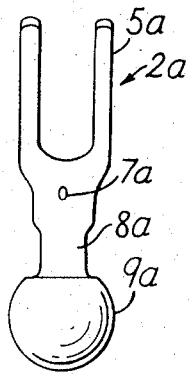

The relevant embodiment is not of symmetrical shaping in so far as the stem junction with the arms is off-set from a central position, and the stem is inclined relative to the medial plane between the arms as seen in a common side view (FIG. 1). Also, the arms are mutually convergent towards their free ends. In these circumstances the embodiment normally will be handed as between use for a left or right hand shoulder joint, but it will be equivalent that variations from this more particular construction allow the production of non-handed embodiments.

The second scapular embodiment is similar to the first such embodiment to the extent indicated by the common reference numerals. Considering then the differences: that most apparent resides in the substitution for the arm 3a of an arm 10b which is a longitudinal extension of the stem shaft 8b. This arm 10b is shortened and is tapered towards its free end to serve as an intracancellous fixation member for securement in association with a gap-filling agent in a suitable bore in the glenoid cavity.

A secondary difference in the second embodiment is that the forked arm 2b is chamfered at 11b around the mutually facing peripheries of the slots to provide relieved areas for receipt of a gap-filling cement. Also, the forks of this arm are apertured at 7b adjacent their free ends.

It is to be noted that this second embodiment is of simplified and symmetrical form, thus facilitating production of a non-handed component.

Turning to the illustrated humeral components: these comprise a bearing member 20 in the form of a cup-shaped socket, and a fixation member 21 in the form of a tapered intramedullary stem having the socket mounted on its wider end. The socket defines a substantially spherically shaped bearing surface 22 of like radius as the associated scapular component head 9 to receive the same in mutual articulatory bearing engagement. The rim of the socket is countersunk at 23 to facilitate location of the associated ball head for engagement therewith and to maximize to relative rotational capability of the engaged bearing members. More particularly, the surface 22 is of major spherical segment form to act against dislocation of the engaged bearing members, and the socket is provided with resilience to allow the bearing members to become engaged.

Figure 7:
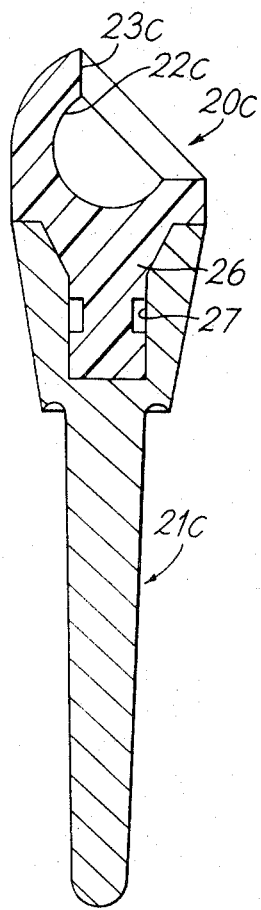
Figure 8:
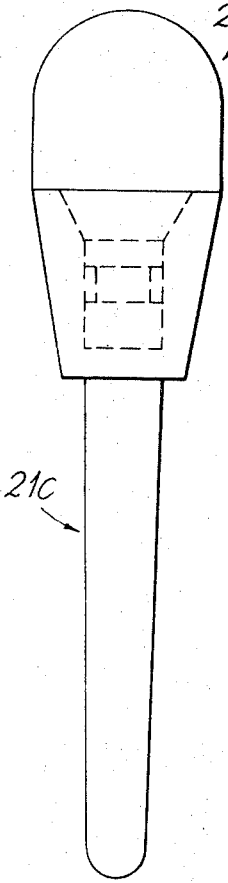

This resilience can be provided by a choice of socket material which has sufficient natural resilience to afford a snap-fit with an associated ball head, as indicated by the socket 20c of FIG. 7 which is of plastics material for association with a metal head 9. Also, the desired resilience can be provided, at least in part, by slotting the socket and applying a locking mechanism after engagement of the ball head. This last arrangement is exemplified by FIG. 11 in which a plastics socket 20c is slotted at 24 to allow radial expansion, and associated with a metal locking ring 25 which can be passed from around the ball head stem, over the socket, to snap around the socket and act against radial expansion.

Variation is also possible in the way in which the socket is mounted on its stem. FIG. 7 shows one example in which the plastics socket 20c is bonded to a metal stem 21c with cement. For this purpose the socket is formed with a subsidiary integral stem 26 for receipt in a cavity 27 in the fixation stem 21c, the stem 26 and cavity 27 having profiles which are not fully complementary and so provide space for the cement to securely key the parts to be bonded.

Figure 9:
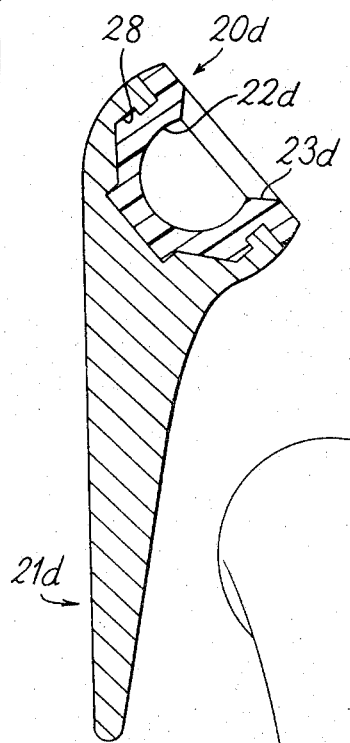
Figure 10:
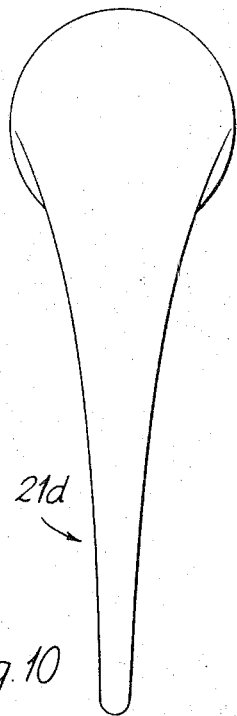

FIG. 9 shows another example in which a plastics socket 20d is seated in a cavity 28 in a metal stem 21d, the socket and cavity being formed in complementary manner with a respective groove and flange to hold the socket against disengagement from the cavity. In fact, this locking arrangement can additionally act against disengagement of the associated ball head from the socket.

In the example of FIG. 11, the plastics socket 20e is integrally formed with a plastics stem in similar relationship to that of FIG. 9. In this case, the stem is preferably grooved to key with a gap-filling cement during implantation.

There is also a variation between the embodiment of FIG. 7 and those of FIGS. 9 and 11 in that a spherical centre of the socket lies on the longitudinal axis of the stem in the former but is off-set from such axis in the latter. The first case is suited to a situation where the whole upper end of the humerus is to be removed, and the second case to a situation where only the articulating head of the humerous is to be removed.

While the invention has been described with reference to the illutrated embodiments, it is to be understood that the more specific details of these embodiments serve to exemplify the invention only by way of example and that other variations are possible. This can be well clarified by consideration of the question of materials for the components of the proposed device. At present the preference is for the scapular component to be of integral metal construction and for the humeral component to include a socket of plastics material. This is consistent with present practice for other endoprosthetic bone joint devices and a suitable choice of specific materials lies in appropriate chrome/cobalt alloys for the metal and high density polyethylene for the plastics material. However, other choices of material are possible. Also, much investigation is being made into the use of ceramic materials, the use of porous surfaces to afford securement by in-growth, and other possibilities which may be appropriate for application in the present invention.

I claim:

1. An endoprosthetic shoulder joint device comprising a scapular component and a humeral component; the scapular component including a generally Y-shaped structure having two Y-arms and a Y-stem, said Y-arms being first fixation members, and said Y-stem being a first bearing member terminating at its free end in a substantially part-spherically shaped bearing surface; and the humeral component including a second bearing member having a substantially part-spherically shaped second bearing surface in mutual articulatory bearing engagement with said first bearing surface, and a second fixation member extending from said second bearing member remotely from said second surface.

2. A device according to claim 1 wherein at least one of said Y-arms is of a first form extending first generally laterally from said Y-stem and then remotely and generally longitudinally relative to said Y-stem.

3. A device according to claim 2 wherein each of said Y-arms is of said first form, and the lateral extensions thereof define an obtuse angle therebetween when viewed along said Y-stem.

4. A device according to claim 3 wherein said Y-arms are of similar longitudinal length relative to said Y-stem.

5. A device according to claim 2, wherein said Y-arms are mutually convergent towards their free ends.

6. A device according to claim 2, wherein said Y-stem is off-set and inclined relative to the medial plane between said Y-arms.

7. A device according to claim 2 wherein a first one of said Y-arms is of said first form, and a second one of said Y-arms extends only as a longitudinal continuation of said Y-stem.

8. A device according to claim 7 wherein said first arm is of greater longitudinal extent than said second arm relative to said Y-stem.

9. A device according to claim 3, wherein each of said Y-arms of said first form is forked at its free end.

10. A device according to claim 3, wherein each of said Y-arms of said first form is apertured for passage of at least one bone screw therethrough.

11. A device according to claim 7, wherein said second arm is convergently tapered towards its free end.

12. A device according to claim 1 wherein said first and second bearing surfaces are respectively those of a convex ball and concave socket.

13. A device according to claim 12, wherein said humeral component is of at least two-part construction, said second bearing member comprises a resilient socket defining said second bearing surface as a major spherical segment to receive said first bearing surface in a snap fit, and said second fixation member comprises an elongate intramedullary stem convergently tapered towards its free end.

* * * * *